US008828196B2

(12) United States Patent
Lönnroth et al.

(10) Patent No.: US 8,828,196 B2
(45) Date of Patent: Sep. 9, 2014

(54) COMPOSITE GLASS SEAL FOR A SOLID OXIDE ELECTROLYSER CELL STACK

(75) Inventors: Nadja Lönnroth, Helsinki (FI); Anne Hauch, Roskilde (DK); Mogens Mogensen, Lynge (DK); Ming Chen, Roskilde (DK)

(73) Assignee: Technical University of Denmark, Kgs. Lyngby (DK)

( * ) Notice: Subject to any disclaimer, the term of this patent is extended or adjusted under 35 U.S.C. 154(b) by 1024 days.

(21) Appl. No.: 12/933,157

(22) PCT Filed: Mar. 20, 2009

(86) PCT No.: PCT/EP2009/002073
§ 371 (c)(1),
(2), (4) Date: Dec. 16, 2010

(87) PCT Pub. No.: WO2009/115341
PCT Pub. Date: Sep. 24, 2009

(65) Prior Publication Data
US 2011/0100805 A1 May 5, 2011

(30) Foreign Application Priority Data

Mar. 20, 2008 (EP) .................................... 08005364

(51) Int. Cl.
C25B 9/18 (2006.01)
C25B 1/06 (2006.01)
H01M 2/08 (2006.01)
(52) U.S. Cl.
USPC ........................................... 204/270; 429/509
(58) Field of Classification Search
USPC ........................................... 204/270; 429/509
See application file for complete search history.

(56) References Cited

U.S. PATENT DOCUMENTS

| 6,165,632 A * | 12/2000 | Blum et al. ............... 429/452 |
| 6,541,146 B1 * | 4/2003 | Xue et al. ............... 429/469 |
| 6,656,625 B1 * | 12/2003 | Thompson et al. ............... 429/465 |
| 7,144,651 B2 * | 12/2006 | Finn et al. ............... 429/460 |
| 2003/0215689 A1 * | 11/2003 | Keegan ............... 429/35 |
| 2004/0209147 A1 * | 10/2004 | Finkenwirth et al. ............... 429/35 |
| 2004/0219417 A1 | 11/2004 | Finkenwirth et al. |

(Continued)

FOREIGN PATENT DOCUMENTS

| DE | 103 02 124 A1 | 7/2004 |
| WO | WO 2006/069753 A1 | 7/2006 |

*Primary Examiner* — Bryan D. Ripa
(74) *Attorney, Agent, or Firm* — Seed IP Law Group PLLC

(57) ABSTRACT

The present invention provides a solid oxide cell stack, comprising: —at least two cells which each comprise a first electrode layer, an electrolyte layer, a second electrode layer, —gas passage ways, and—sealing components, wherein the sealing components comprise a glass component and a component comprising a metal oxide or metal oxide precursor, and wherein the component comprising the metal oxide or metal oxide precursor is located at least in between the glass component and a gas passage way. The present invention further provides a method of producing the above solid oxide cell stack, comprising the steps of: —providing at least two SOC cells comprising each a first electrode layer or electrode precursor layer, an electrolyte layer, a second electrode layer or electrode precursor layer; —stacking at least two cells so as to form a cell stack including gas passage ways; and—sealing said cell stack with sealing components, wherein the sealing components comprise a glass component and a component comprising a metal oxide or metal oxide precursor, and wherein the component comprising the metal oxide or metal oxide precursor is at least located in between the glass component and a gas passage way.

9 Claims, 3 Drawing Sheets

(56) References Cited

U.S. PATENT DOCUMENTS

| | | | |
|---|---|---|---|
| 2006/0012135 A1* | 1/2006 | Chou et al. | 277/654 |
| 2006/0019813 A1* | 1/2006 | Yoshii | 501/15 |
| 2006/0051661 A1 | 3/2006 | Meacham | |
| 2006/0063057 A1* | 3/2006 | Weil et al. | 429/34 |
| 2006/0063659 A1 | 3/2006 | Xue et al. | |
| 2006/0286428 A1* | 12/2006 | Weng et al. | 429/35 |
| 2008/0131739 A1* | 6/2008 | Badding et al. | 429/13 |
| 2008/0248361 A1* | 10/2008 | Larsen et al. | 429/32 |

\* cited by examiner

COMPOSITE GLASS SEAL FOR A SOLID OXIDE ELECTROLYSER CELL STACK

TECHNICAL FIELD

The present invention relates to a solid oxide cell (SOC) stack comprising a composite glass seal, wherein the stack is thermodynamically stable over a wide temperature operational range and oxygen partial pressure range, and to a method for preparing a sealed SOC stack.

BACKGROUND ART

Solid oxide cells (SOCs) generally include cells designed for different applications, such as solid oxide fuel cells (SOFCs) or solid oxide electrolysis cells (SOECs). Due to their common basic structure, the same cell may, for example, be used in SOFC applications as well as SOEC applications. Since in SOFCs fuel is fed into the cell and converted into power, while in SOECs power is applied to produce fuel, these cells are often referred to as 'reversible' SOCs.

Solid oxide cells may have various designs. Typical configurations include an electrolyte layer being sandwiched between two electrodes. During operation of the cell, usually at temperatures of about 500° C. to about 1100° C., one electrode is in contact with oxygen or air, while the other electrode is in contact with a fuel gas.

The most common manufacture processes suggested in the prior art comprise the manufacture of single cells. Generally, a support is provided, on which an electrode layer is formed, followed by the application of an electrolyte layer. The so formed half cell is dried and afterwards sintered, in some cases in a reducing atmosphere. Finally, a second electrode layer is formed thereon so as to obtain a complete cell. Alternatively, one of the electrode layers or the electrolyte layer may be used as a support layer, having a thickness of about 300 μm or more.

Under typical operating conditions, a single cell voltage is around 1±0.5 volt. To obtain high voltage and power from the SOCs, it is therefore necessary to stack many cells together. The most common manufacturing method for SOC planar stacks comprises the manufacture of single cells. The cells are subsequently stacked together with interconnects, current collectors, contact layers and seals. After assembly, the stacks are consolidated/sealed by heat treatment under a vertical load to ensure sealing as well as electrical contact between the components. Gas tight sealings are virtually important for the performance, durability and safely operation of a fuel cell as well as an electrolyser stack.

Silica based glass is a suitable sealing material for SOCs since the physical and chemical properties of glass can be tailored within a wide range. Different glass and glass-ceramic compositions have been examined within the group of alkali silicate, alkali aluminosilicates, alkaline earth silicates, alkaline earth aluminoborosilicates, and borosilicate glasses. However, even though promising results have been reported, none of them have been able to fulfill all the requirements of mechanical performance, e.g. viscosity and match of thermal expansion and chemical compatibility, e.g. wetting and bonding, at the same time.

In order to tailor the properties of the polymeric silica glass, network modifiers and network formers are added to the glass structure during melting. For example, Na containing compounds are added to increase the thermal expansion coefficient and Al containing compounds are added to balance the charge and thereby to avoid the bond breaking action of the Na, i.e. to prevent a depolymerisation of the $SiO_4^{4-}$ tetrahedron in the glass network.

However, especially when a SOC is used as an electrolysis cell, the conditions at the fuel gas electrode during operation of the cell are critical as water vapor has to be present. The high vapor pressure of the steam and the elevated temperatures result in corrosion of the glass seal. Some components in the glass seal, for example $SiO_2$ and $Na_2O$, may react with water and hydrogen so as to form volatile species with a high vapor pressure. Said species may then be transported into the adjacent electrode layers of the cell and are deposited at the reactive sites, thereby blocking and passivating these sites. Thus, the performance of the electrode decreases over time due to the decrease of active sites.

OBJECT OF THE PRESENT INVENTION

In view of the disadvantages of the glass seals used up to date, it is therefore the object of the present invention to provide an improved SOEC stack having excellent durability, extended life time and good performance, and to provide a method for preparing said SOEC stack.

SUMMARY

The above object is achieved by a solid oxide cell stack, comprising:
- at least two cells which each comprise a first electrode layer, an electrolyte layer, a second electrode layer,
- gas passage ways; and
- sealing components, wherein the sealing components comprise a glass component and a component comprising a metal oxide or metal oxide precursor, and wherein the component comprising the metal oxide or metal oxide precursor is located at least in between the glass component and a gas passage way.

The above object is further achieved by a method of producing the above solid oxide cell stack, comprising the steps of:
- providing at least two SOC cells comprising each a first electrode layer or electrode precursor layer, an electrolyte layer, a second electrode layer or electrode precursor layer;
- stacking at least two cells so as to form a cell stack including gas passage ways; and
- sealing said cell stack with sealing components, wherein the sealing components comprise a glass component and a component comprising a metal oxide or metal oxide precursor, and wherein the component comprising the metal oxide or metal oxide precursor is located at least in between the glass component and a gas passage way.

Preferred embodiments are set forth in the subclaims and the following detailed description of the invention.

DETAILED DESCRIPTION OF THE INVENTION

The present invention provides a solid oxide cell stack, comprising:
at least two cells which each comprise a first electrode layer, an electrolyte layer, a second electrode layer,
gas passage ways; and
sealing components,
wherein the sealing components comprise a glass component and a component comprising a metal oxide or metal oxide precursor, and wherein the component comprising the metal oxide or metal oxide precursor is located at least in between the glass component and a gas passage way.

Advantageously, the composite sealing component prevents the migration of volatile phases from the glass component into the respective cell layers, thereby preventing a passivation and blocking of the reactive sites in the electrode layer, and in return extending the overall lifetime of the cell stack.

Furthermore, the glass sealing material for the SOC stack may be selected and finetuned according to the required application with more freedom and choice, as the specific composite seal effectively prevents any volatile impurity species from blocking the reactive sites, thereby making the stack more cost efficient without sacrificing the lifetime of the stack.

The solid oxide cell stack of the present invention comprises a number of gas passage ways for fuel gas and oxygen or air to the electrodes of each cell, and gas passage ways away from the respective electrodes. The glass sealing of the glass component provides an effective gas tight seal of said passage ways. Furthermore, the component comprising a metal oxide or metal oxide precursor is located at least in between the component and a gas passage way to prevent the migration of volatile phases from the glass component into the cell.

Glass Component

Figure 1A:
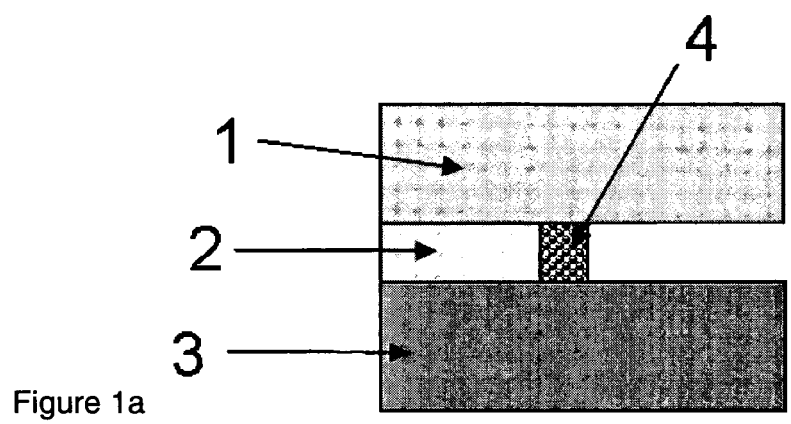
FIG. 1a and 1b illustrate schematically the composite sealing in a SOEC stack of the present invention.

The seal comprises a glass component which is 'deformable' under sealing conditions. The deformability of the glass phase is unique and is required to ensure a good sealing of an SOC stack. Deformability in the sense of the present invention refers to the glass softening under sealing conditions, i.e. under elevated temperature and pressure, so that a compact seal can be formed, as illustrated in FIG. 1a. More specifically, the glass of the glass component changes from a solid state to a viscous state and is then shapeable, or formable, to form a sealing layer in between the respective two components of the stack, filling all eventual cavities.

The glass component is preferably based on silica glass. According to the invention, the base glass powder is preferably selected from the group consisting of alkali and alkaline earth silicates, alkaline earth and alkali aluminosilicates, (NAS), alkaline earth aluminoborosilicates, (CAS), and phosphate glasses, (MAP), to which metal oxides may be added, such as magnesium oxide.

Alkali alumosilicates, (NAS), suitable for the present invention comprise 10-25 mole % sodium oxide, 40-80 mole % silicon dioxide, 5-20 mole % aluminium oxide, and may optionally comprise 0-10 mole % boric oxide, 0-10 mole % magnesium oxide, 0-10 mole % calcium oxide, 0-10 mole % barium oxide, 0-2 mole % fluorine, and 0-5 mole % phosphor oxide.

Alkaline earth alumoborosilicates (CAS), suitable for the present invention comprise 40-80 mole % silicon dioxide, 5-20 mole % aluminium oxide, 20-45 mole % calcium oxide, and may optionally comprise 0-5 mole % sodium oxide, 0-10 mole % boric oxide, 0-10 mole % magnesium oxide, 0-2 mole % barium oxide, 0-2 mole % fluorine, and 0-5 mole % phosphor oxide.

Phosphate glasses (MAP) suitable for the present invention comprise 5-25 mole % aluminium oxide, 10-30 mole % magnesium oxide, 5-20 mole % calcium oxide, 40-60 mole % phosphor oxide and may optionally comprise 0-5 mole % sodium oxide, 0-12 mole % silicon dioxide, 0-10 mole % boric oxide, 0-5 mole % barium oxide, and 0-2 mole % fluorine.

Table 1 illustrates the compositional range for the base glasses used as defined above.

TABLE 1

| Mole % | "NAS" | "MAP" | "CAS" |
|---|---|---|---|
| Sodium oxide | 10-25 | 0-5 | 0-5 |
| Silicon dioxide | 40-80 | 0-12 | 40-70 |
| Aluminium oxide | 5-20 | 5-25 | 5-20 |
| Boric oxide | 0-10 | 0-10 | 0-10 |
| Magnesium oxide | 0-10 | 10-30 | 0-10 |
| Calcium oxide | 0-10 | 5-20 | 20-45 |
| Barium oxide | 0-10 | 0-5 | 0-2 |
| Fluorine | 0-2 | 0-2 | 0-2 |
| Phosphor oxide | 0-5 | 40-60 | 0-5 |
| Iron oxide | 0-2 | 0-2 | 0-2 |
| Titanium oxide | 0-2 | 0-2 | 0-4 |

TABLE 2

| Mole % | CAS-1 | NAS-1 | NAS-2 | BAS-1 |
|---|---|---|---|---|
| Sodium oxide | 0.5 | 17.8 | 12.5 | |
| Silicon dioxide | 39.4 | 72.8 | 75.0 | 30 |
| Aluminium oxide | 10.1 | 9.4 | 12.5 | 10 |
| Boric oxide | 4.5 | | | 15 |
| Magnesium oxide | 4.6 | | | |
| Calcium oxide | 40.1 | | | |
| Barium oxide | | | | 40 |
| Fluorine | 0.8 | | | |
| Lanthanum oxide | | | | 5 |

Suitable glass types include NAS, CAS, MAP and BAS. Preferred examples of base glass powders are listed in Table 2.

The seal preferably comprises the glass in an amount of from 10 to 98 weight percent, based on the overall weight of the seal, and more preferably in an amount of from 50 to 90 weight percent.

Optional Additives

The glass composition may further comprise additives which as usual in the art in amounts of up to 30 percent by volume, such as $SiO_2$, $ZrO_2$, YSZ, steel, MgO, NiO, and various metal oxides.

Component Comprising a Metal Oxide

The seal further comprises a component comprising a metal oxide or metal oxide precursor located at least in between the glass component and a gas passage way of the cell stack. The component acts as a barrier increasing the diffusion distance of volatile phases to the respective cell components. The component on the one hand acts as a physical barrier, on the other hand functions as a chemical barrier, i.e. as a sink or getter material, reacting chemically with the volatile phases to form a silicon containing oxide phase, thereby effectively preventing migration. By 'metal oxide precursor' in the sense of the present invention, it is referred to compounds not being oxides themselves but being converted into the respective oxides under operating temperatures. For example, carbonates and hydroxides will convert to the respective oxides and carbon dioxide or water under elevated temperatures, and carbon dioxide and water will afterwards be evaporated via the gas passage ways out of the cell stack.

The component is preferably a porous layer with a porosity of from 20 to 90%, more preferably of from 30 to 80%, and most preferably of from 40 to 70%. In the present invention, the porosity is determined by the mercury intrusion method as described in Chapter 4 of "Analytical Methods in Fine Particle Technology" by Paul Webb and Clyde Orr, published by Micromeritics Instrument Corporation, GA, USA, 1997. A higher porosity allows more surface reaction area with the volatile phases and is thus preferred.

It is also preferred that the component is nanocrystalline to ensure a high reactivity. Preferably, the crystal size is in the range of from 1 to 1000 nm, more preferably of from 1 to 300 nm, and most preferably of from 5 to 50 nm.

Preferably, the metal oxide for the component comprising the metal oxide is selected from the group of materials or precursor materials consisting of ceria, alkaline earth oxides, carbonates, nitrates and hydroxides and mixtures thereof and other metal oxides of alkaline character such as $La_2O_3$ and ceria ($Ce_2O_3$). More preferred are SrO, $Sr(OH)_2$, $SrCO_3$, $BaCO_3$, and $CaCO_3$, with SrO being most preferred. Also preferred is $La_2O_3$ and ceria.

The metal oxide component may comprise further materials to ensure a solid backbone, for example a 'cement' to keep the metal oxide in the desired place. This 'cement'-phase can be in the range 0 to 80 weight percent and is preferably from 1 to 50 weight percent, more preferably of from 2 to 25 weight percent, based on the total weight of the component. This 'cement' is based on metal oxides, such as MgO, $Al_2O_3$, $TiO_2$ or stabilized $ZrO_2$. The additional metal oxides form a binding network during the sintering of the seal, thereby 'fixing' the metal oxide of the component in place.

The seal preferably comprises the component comprising a metal oxide in an amount of from 2 to 90 weight percent, based on the overall weight of the seal, and more preferably in an amount of from 10 to 50 weight percent. Less amount of metal oxide results in an insufficient protection against volatile phases, while an excess on the other hand results in unnecessary costs and insufficient sealing properties of the glass component.

The Cell Comprising an Electrolyte Layer and Electrode Layers

The solid oxide cells to be stacked may be any kind of cell as known in the art, without limitation. The materials for the electrolyte layer and electrode layers may in principle be any suitable materials as known in the art, as desired for the respective application.

The cell may further comprise a support layer if desired, or one of the electrolyte layer or electrode layers may exhibit a sufficient thickness to function as a support layer.

Furthermore, the SOC stack comprises in addition to the stacked cells further layers, such as current collector layers, interconnects, barrier layers, adhesive layers, sealing layers and the like, as is known in the art.

While the figures refer to a planar stack, the stack may of course have any desired design, including planar and tubular designs, as is known to a person skilled in the art.

Method of the Invention

The present invention also provides a method of producing the above solid oxide cell stack, comprising the steps of:
providing at least two SOC cells comprising each a first electrode layer or electrode precursor layer, an electrolyte layer, a second electrode layer or electrode precursor layer;
stacking at least two cells so as to form a cell stack including gas passage ways; and
sealing said cell stack with sealing components,
wherein the sealing components comprise a glass component and a component comprising a metal oxide or metal oxide precursor, and wherein the component comprising the metal oxide or metal oxide precursor is located at least in between the glass component and a gas passage way.

Preferably, the sealing component is applied by screen printing. Also preferred is the sealing component being applied by spraying or in form of sheets. Alternatively, the sealing component may preferably be applied as glass bars, fibers and woven or non-woven glass cloths or by dip coating the stack into a suspension comprising the glass, followed by drying and a heat treatment.

Figure 1B:
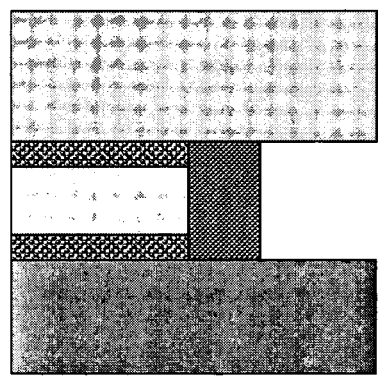

FIG. 1a illustrates the composite seal between an electrode of a cell (1) and an interconnector (3). The seal consists of the glass component (2) and the porous metal oxide component (4). In FIG. 1b, illustrating a more preferred embodiment, the metal oxide component is also present on top and below the glass component, effectively forming a barrier in between the glass and a gas passage way.

Figure 2:
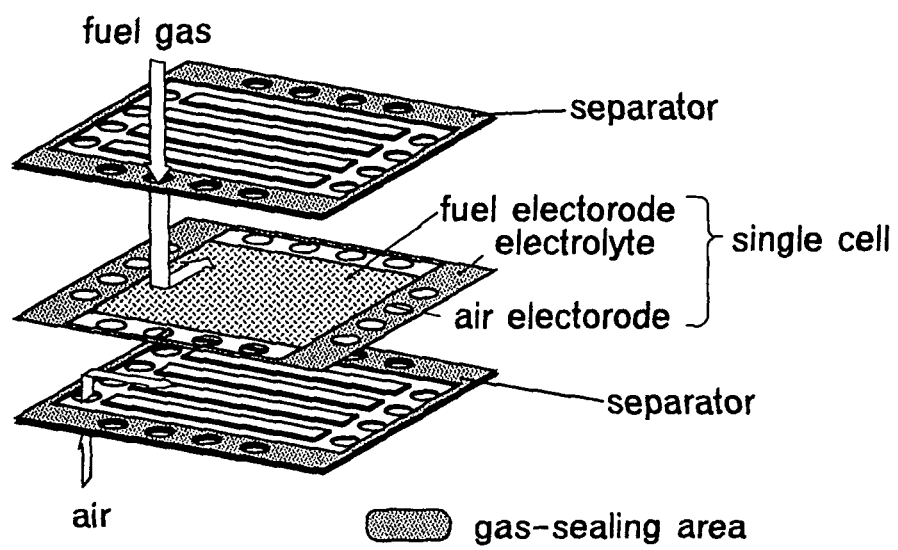
FIG. 2 illustrates the sealing areas in a flat plate SOEC with internal manifolding.

FIG. 2 illustrates the sealing areas in a flat plate SOC stack with internal manifolding. The respective areas on the electrolyte layer and the respective areas on the separators are sealed with the seal. The layers may preferably be manufactured individually and the sealing composition is screen printed on the respective areas prior to assembling the stack. Each cell to be stacked further comprises a fuel electrode and an air electrode. In the final stack, fuel gas and air are provided via the manifolds to the respective electrodes as indicated by the arrows.

Figure 3:
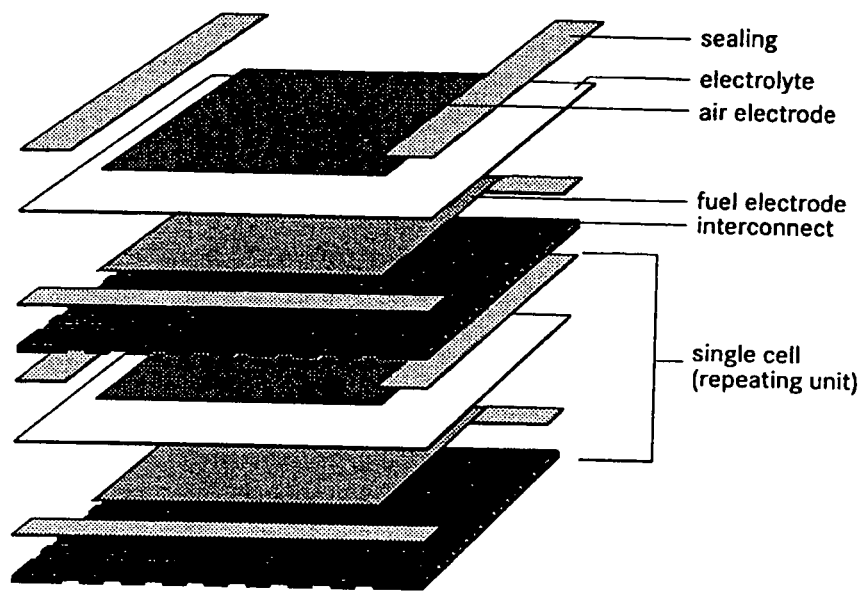
FIG. 3 illustrates schematically the layers and sealing areas in a planar SOEC stack.

FIG. 3 illustrates schematically the various layers and sealing areas in another embodiment of a planar SOC stack in accordance with the present invention. As shown in the exploded view, the seal is preferably pressed into sheets or foils, which are cut into the respective size, and then the stack is assembled accordingly. The cell stack also comprises interconnects in between each single cell. The interconnects are preferably formed from a metal or metal alloy.

The sealing step of the stack in accordance with the present invention is carried out under elevated temperatures, depending on the specific components used, particularly the base glass powder. Preferred temperatures for the bonding are from 400° C. to 1100° C. It is also preferred to select the temperature to be from around 200° C. above the glass transition temperature in question and even more preferred from around 100° C. above the glass transition temperature in question.

In a preferred embodiment, the component is not only applied such it is located in between the glass component and the gas passage ways (in FIG. 1 illustrated as being located to the right of the component, but is also located in between the glass compound of the seal and other cell components, i.e. those compounds which would otherwise be in contact with the glass component. In a more preferred embodiment, the component is present in between the glass component and all parts of the cell stack being in contact with the glass component, as illustrated in FIG. 1b. During the sealing of the stack, the glass will flow into the porous metal oxide layers on top and below the glass component and fills the pores to produce an airtight seal. In the inner part, the component will fill the complete area in between the cell components, and will be compressed a due to its initial higher thickness. As the component is a porous layer, the porosity allows compression.

The present invention will now be described by the following examples. The invention is however intended to be not limited thereto.

Example 1

Seals Prepared by Two Step Screen Printing

Step 1: Screen Printing of the Glass Component

A screen printing ink is prepared from the glass powder CAS-1 by suspending the powder in terpineol together with a binder, a plasticizer and a dispersant. Glass is printed on the outer part of the sealing area, covering about ¾ of the width of the sealing area to be sealed.

Step 2: Preparing the Metal Oxide Component

Nanocrystalline SrO powder is prepared with crystal sizes of about 30 nm by precipitating from a $Sr(NO_3)_2$ solution.

Step 3: Screen Printing the Metal Oxide Component

The metal oxide powder mixture prepared in step 2 is suspended in solution with a solvent (terpineol), a binder, a dispersant and a plasticizer. This ink is printed on the inner edge of the sealing area, covering the ¼ of the area that was not covered by the glass component. Thus the sink material is located next to the glass on the side towards the cell and the gas passage ways.

Example 2

Seals Prepared by Spraying and Screen Printing

Step 1: Preparing Metal Oxide Component Preparing as in example 1 step 2.

Step 2: Applying the Metal Oxide Component by Spraying

The metal oxide component is suspended in a solvent with a binder to produce a sprayable ink. The ink is sprayed onto the whole area of sealing. A highly porous layer is applied such that the sintered thickness, not applying a weight, would be approximately 50% thicker than the preferred sealing thickness.

Step 3: Applying the Glass Component

The glass is screen printed on top of the metal oxide component on the outer ¾ of the full sealing width. The final seal is illustrated in FIG. 1b.

Example 3

Seals Prepared by Screen Printing Having a Backbone in the Porous Structure

Step 1: Preparing the Metal Oxide Component and Backbone

Alumina particles were mixed with SrO.

Step 2: Applying the Metal Oxide Component and the Backbone

A screen printing ink was prepared with the mixed powder and was screen print on the inner ¼, as in Example 1.

Step 3: Screen Printing the Glass Component

The glass is screen printed as in example 1 on the outer ¾ of the sealing width.

The invention claimed is:

1. A solid oxide cell stack, comprising:
   at least two cells which each comprise a first electrode layer, an electrolyte layer, a second electrode layer;
   gas passage ways; and
   sealing components,
   wherein the sealing components comprise a glass component and a component comprising a metal oxide or a metal oxide precursor, and wherein the component comprising the metal oxide or the metal oxide precursor is located at least in between the glass component and one of the gas passage ways, and
   wherein the component comprising the metal oxide or the metal oxide precursor is a porous layer with a porosity of from 20 to 90%.

2. The solid oxide cell stack of claim 1, wherein the glass component is a silica based glass component.

3. The solid oxide cell stack of claim 1, wherein the metal oxide or the metal oxide precursor for the component comprising the metal oxide or the metal oxide precursor is selected from the group of materials or precursor materials consisting of alkaline earth oxides, carbonates, nitrates, hydroxides, and mixtures thereof and other metal oxides of alkaline character.

4. The solid oxide cell stack of claim 3, wherein the metal oxide for the component comprising the metal oxide or the metal oxide precursor is SrO.

5. The solid oxide cell stack of claim 3, wherein the metal oxide precursor for the component comprising the metal oxide or metal oxide precursor is $SrCO_3$.

6. The solid oxide cell stack of any one of claims 1, 2, 3 and 5, wherein the solid oxide cell stack is a solid oxide electrolysis cell stack.

7. A method of producing a solid oxide cell stack, comprising the steps of:
   providing at least two cells each comprising a first electrode layer or electrode precursor layer, an electrolyte layer, and a second electrode layer or electrode precursor layer;
   stacking the at least two cells so as to form a cell stack, the stack including gas passage ways; and
   sealing said cell stack with sealing components,
   wherein the sealing components comprise a glass component and a component comprising a metal oxide or a metal oxide precursor, and wherein the component comprising the metal oxide or the metal oxide precursor is located at least in between the glass component and one of the gas passage ways,
   wherein the component comprising the metal oxide or the metal oxide precursor is a porous layer with a porosity of from 20 to 90%.

8. The method of claim 7, wherein the sealing components are applied by screen printing.

9. The method of any one of claims 7 and 8, further comprising the step of impregnating the first electrode layer or electrode precursor layer and/or the second electrode layer or electrode precursor layer with a catalyst or catalyst precursor material.

* * * * *

UNITED STATES PATENT AND TRADEMARK OFFICE
CERTIFICATE OF CORRECTION

| | | |
|---|---|---|
| PATENT NO. | : 8,828,196 B2 | Page 1 of 1 |
| APPLICATION NO. | : 12/933157 | |
| DATED | : September 9, 2014 | |
| INVENTOR(S) | : Nadja Lönnroth et al. | |

It is certified that error appears in the above-identified patent and that said Letters Patent is hereby corrected as shown below:

In the claims,

Column 8, lines 31-32:

"6. The solid oxide cell stack of any one of claims 1, 2, 3 and 5, wherein the solid oxide cell stack is a solid oxide" should read --6. The solid oxide cell stack of any one of claims 1, 2, 3 and 4, wherein the solid oxide cell stack is a solid oxide--.

Signed and Sealed this
First Day of March, 2016

Michelle K. Lee
*Director of the United States Patent and Trademark Office*